(12) United States Patent
Oh

(10) Patent No.: US 10,463,193 B2
(45) Date of Patent: Nov. 5, 2019

(54) OUTDOOR COOKWARE LID COMPRISING SUCTION HANDLE

(71) Applicant: POKETDREAM INC., Seoul (KR)

(72) Inventor: Kuen Sik Oh, Seoul (KR)

(73) Assignee: POKETDREAM INC., Seoul (KR)

( * ) Notice: Subject to any disclaimer, the term of this patent is extended or adjusted under 35 U.S.C. 154(b) by 0 days.

(21) Appl. No.: 15/516,745

(22) PCT Filed: Oct. 16, 2015

(86) PCT No.: PCT/KR2015/010940
§ 371 (c)(1),
(2) Date: Sep. 18, 2017

(87) PCT Pub. No.: WO2016/068530
PCT Pub. Date: May 6, 2016

(65) Prior Publication Data
US 2018/0014690 A1    Jan. 18, 2018

(30) Foreign Application Priority Data

Oct. 27, 2014   (KR) .................. 10-2014-0146519

(51) Int. Cl.
*F16B 47/00*     (2006.01)
*A47J 45/07*     (2006.01)
*A47J 36/06*     (2006.01)

(52) U.S. Cl.
CPC ............. *A47J 36/06* (2013.01); *A47J 45/074* (2013.01); *F16B 47/00* (2013.01)

(58) Field of Classification Search
CPC .. A47J 36/06; A47J 45/00; A47J 45/07; A47J 45/071; A47J 45/072; A47J 45/074; A47J 45/075; A47J 45/077; A47J 45/078; F16B 47/00; B65G 49/061; B65G 47/91; Y10S 292/28; B65B 11/005; B65B 11/007; B25B 11/005; B25B 11/007; B66C 1/0268
USPC ................... 248/205.9, 205.8; 294/186, 187
See application file for complete search history.

(56) References Cited

U.S. PATENT DOCUMENTS

| | | | | |
|---|---|---|---|---|
| 450,447 | A | * 4/1891 | Buchwalter | .......... A41D 13/087 2/21 |
| 3,042,958 | A | * 7/1962 | Spears | .................. E05C 17/525 16/84 |
| 3,649,069 | A | 3/1972 | Zip | |
| 6,827,344 | B1 | 12/2004 | Ristau | |

(Continued)

FOREIGN PATENT DOCUMENTS

| | | |
|---|---|---|
| FR | 2524791 A1 | 10/1983 |
| JP | 53-098658 U | 8/1978 |

(Continued)

OTHER PUBLICATIONS

International Search Report dated Jan. 22, 2016 for PCT/KR2015/010940.

*Primary Examiner* — Allan D Stevens
(74) *Attorney, Agent, or Firm* — Knobbe Martens Olson & Bear LLP

(57) ABSTRACT

The present invention relates to an outdoor cookware lid including a suction handle, and more particularly, to an outdoor cookware lid including a suction handle that is easily attachable using a suction plate and easily detachable to reduce the volume of the outdoor cookware lid when carrying the outdoor cookware lid.

4 Claims, 2 Drawing Sheets

(56) References Cited

U.S. PATENT DOCUMENTS

| | | | |
|---|---|---|---|
| 2009/0182346 A1* | 7/2009 | Uddenberg | A61B 17/442 606/123 |
| 2014/0319159 A1* | 10/2014 | Bochenek | A47J 45/074 220/759 |
| 2016/0064121 A1* | 3/2016 | Rougier | H01B 13/01227 29/868 |

FOREIGN PATENT DOCUMENTS

| | | |
|---|---|---|
| JP | 55-115427 U | 8/1980 |
| JP | 61-12441 U | 1/1986 |
| JP | 63-3336 U | 1/1988 |
| KR | 20-1993-0002071 | 2/1993 |
| KR | 10-2011-0028884 | 3/2001 |
| KR | 20-0329313 | 10/2003 |
| KR | 20-0344671 | 3/2004 |
| KR | 20-2007-0001254 | 12/2007 |
| KR | 10-1379754 | 3/2014 |

* cited by examiner

OUTDOOR COOKWARE LID COMPRISING SUCTION HANDLE

This application claims the priority of Korean Patent Application No. 10-2014-0146519, filed on Oct. 27, 2014 in the KIPO (Korean Intellectual Property Office), the disclosure of which is incorporated herein entirely by reference. Further, this application is the National Stage application of International Application No. PCT/KR2015/010940, filed Oct. 16, 2015, which designates the United States and was published in Korean. Each of these applications is hereby incorporated by reference in their entirety into the present application.

TECHNICAL FIELD

The present invention relates to an outdoor cookware lid including a suction handle, and more particularly, to an outdoor cookware lid including a suction handle that is easily attachable using a suction plate and easily detachable to reduce the volume of the outdoor cookware lid when carrying the outdoor cookware lid.

BACKGROUND ART

In general, outdoor cookware refers to outdoor cooking utensils used for cooking food in indoor places. Since outdoor cookware is light and easy to carry, outdoor cookware is widely used for cooking food during outdoor activities such as hiking, fishing, or camping.

Such outdoor cookware widely used for cooling food during activities such as hiking or camping has a lid to close an upper side thereof. When in use, a lid is put on top of outdoor cookware after inserting food into the outdoor cookware, and the outdoor cookware is placed on a camping burner or a portable gas stove.

The number of people enjoying outdoor activities has increased along with the increase of income, and thus the use of outdoor cookware has also increased. Thus, outdoor cookware having various shapes and functions has been released on the market.

For example, such outdoor cookware may include a cylindrical vessel body, a handle provided on an outer surface of the body for a user to grip during cooking, and a lid provided on an upper side of the outdoor cookware.

In general, outdoor cookware includes a plurality of sets of vessels and lids having various sizes. To reduce the volume of outdoor cookware sets when carrying or storing the outdoor cookware sets, the outdoor cookware sets may be nested inside one another by placing a relatively small outdoor cookware set inside a relatively large outdoor cookware set until all the other outdoor cookware sets are inserted into the largest outdoor cookware set. Since the largest outdoor cookware set accommodates all the other outdoor cookware sets, a user may easily carry all sets of outdoor cookware as if the user carries only one big outdoor cookware set.

Therefore, outdoor cookware sets have been manufactured to have fewer and closely contacting protrusions in order to minimize the total volume of outdoor cookware sets and improve spatial efficiency by placing a relatively small outdoor cookware set inside a relatively large outdoor cookware set when storing the outdoor cookware sets.

Most outdoor cookware lids have a circular plate shape having a handle on an upper side or lateral side thereof. However, such a handle inevitably has a grip part protruding outward, and thus the volume of an outdoor cookware set increases.

In the related art, outdoor cookware including a foldable handle or a flat handle to reduce the volume of the outdoor cookware has been proposed, for example, in Korean Utility Model Application Publication No. 20-2007-0001254.

However, such a foldable handle or a flat handle still increases the volume of an outdoor cookware set because of protruded parts.

In addition, since handles are respectively provided on lids, the volume of outdoor cookware increases as the number of handles increases.

A lid may be flipped and may be used as a dish. In this case, the lid may not be stably placed on a table because of a handle of the lid, and the handle may have a negative effect on the appearance of the lid used as a dish.

DISCLOSURE OF THE INVENTION

Technical Problem

The present invention is provided to solve the above-described problems, and an object of the present invention is to provide an outdoor cookware lid including a suction handle. When storing the outdoor cookware lid, the volume of the outdoor cookware lid may be minimized by detaching the suction handle protruding from the outdoor cookware lid. The suction handle of the outdoor cookware lid may be used with other lids, thereby reducing the volume of lids when carrying lids. When the outdoor cookware lid is flipped and used as a dish, the suction handle may be detached from the outdoor cookware lid so as to stably place the outdoor cookware lid and improve the appearance of the outdoor cookware lid.

Technical Solution

According to an embodiment of the present invention, an outdoor cookware lid includes a circular plate configured to cover an opened upper side of the outdoor cookware vessel and a handle attachable to an upper center portion of the circular plate, wherein the handle includes: a body having a tubular shape; and a center post having a rod shape and inserted in the body, wherein the body includes: a soft suction plate extending like a flange from a lower end portion of the body so as to be fixedly attached to the upper center portion of the circular plate by suction; a lower recess defined in a lower end center portion of the body and communicating with an inside of the body; a slide guide communicating with the lower recess; and an upper recess communicating with the slide guide, an upper side of the body being opened through the upper recess, wherein the center post is longer than a length between an upper end portion of the upper recess of the body and a lower end portion of the lower recess of the body such that when in a suction attachment state, the center post protrudes and becomes pressable from an upper side of a center portion of the body, wherein the center post includes: an upper head having an outer diameter surface for tight engagement with an inner diameter surface of the upper recess; a slide rod extending from a lower end of the upper head and slidable inside the slide guide; and a lower head extending from a lower end of the slide rod and having an outer diameter surface for tight engagement with an inner diameter surface of the lower recess.

The inner diameter of the slide guide is smaller than the inner diameter of the lower recess.

Boundary portions between the slide rod, the upper head, and the lower head of the center post have a gradually curved slope shape.

A suction attachment mark having a ring shape is formed on the upper center portion of the circular plate.

Advantageous Effects

According to embodiments of the present invention, an outdoor cookware lid includes a suction handle that is attachable to the outdoor cookware lid by suction. The suction handle is detachable from the outdoor cookware lid to reduce the volume of the outdoor cookware lid when storing the outdoor cookware lid. The suction handle may be used with other lids, thereby reducing the volume of lids when carrying lids. When the outdoor cookware lid is used as a dish, the suction handle may be detached from the outdoor cookware lid so as to stably place the outdoor cookware lid and improve the appearance of the outdoor cookware lid. The suction handle may be easily detached from the outdoor cookware lid in a simple manner by pressing a head provided on an upper side of the suction handle to remove adhesive force, thereby preventing a user from being burned. The suction handle may be easily attached to the outdoor cookware lid in a simple manner by placing the suction handle on a center portion of a circular plate and pressing the suction handle.

MODE FOR CARRYING OUT THE INVENTION

Figure 1:
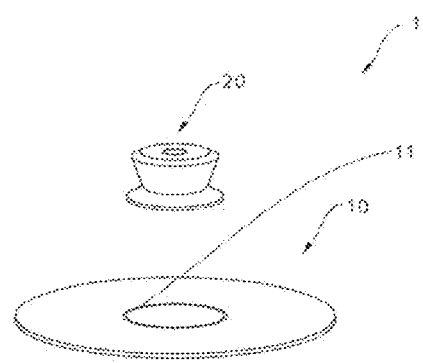
FIG. 1 is a perspective view illustrating an embodiment of the present invention.

Preferred embodiments of the present invention will now be described in detail with reference to the accompanying drawings. However, various changes in form and details may be made within the scope of the present invention, and the scope of the present invention is not limited to the embodiments described below. The embodiments are provided so that this disclosure will be thorough and complete, and will fully convey the scope of the invention to those of ordinary skill in the art. In the drawings, the shapes and dimensions of elements may be exaggerated for clarity, and like reference numerals denote like elements.

Figure 2:
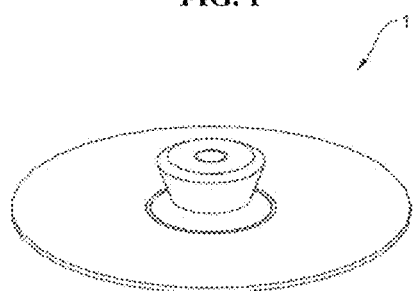
FIG. 2 is a perspective view illustrating an embodiment of the present invention.

FIG. 1 is a perspective view illustrating a state in which a circular plate 10 and a handle 20 are separated from each other, according to an embodiment of the present invention. FIG. 2 is a perspective view illustrating a state in which the circular plate 10 and the handle 20 are coupled to each other.

Figure 3:
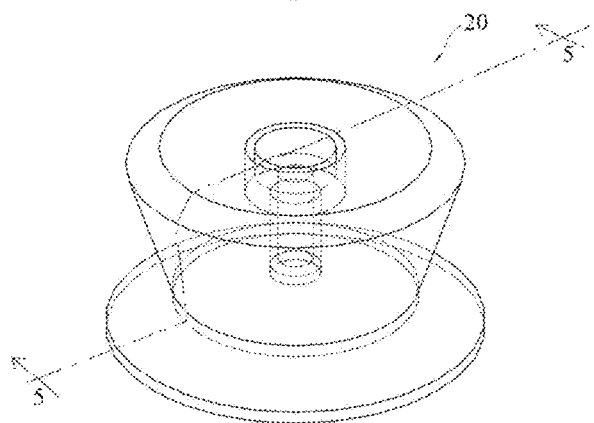
FIG. 3 is a partial perspective view illustrating an embodiment of the present invention.
Figure 4:
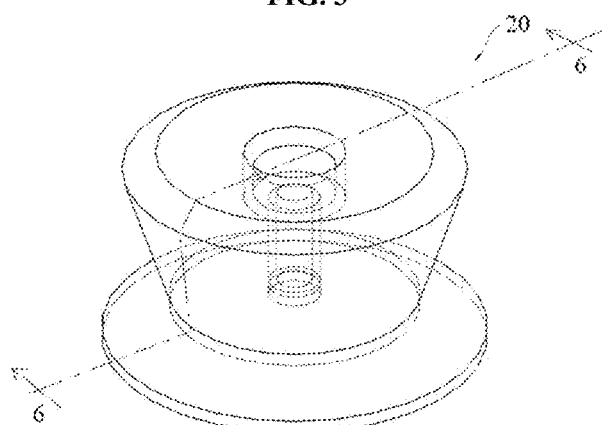
FIG. 4 is a partial perspective view illustrating an embodiment of the present invention.
Figure 5:
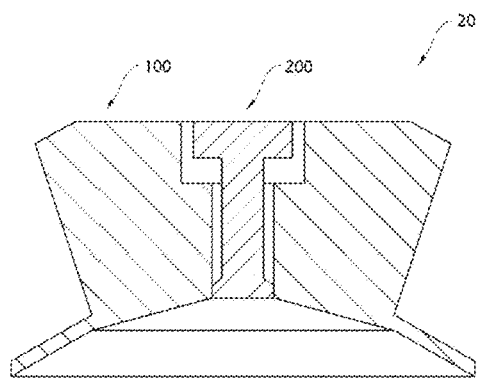
FIG. 5 is a partial cross-sectional view illustrating an embodiment of the present invention.
Figure 6:
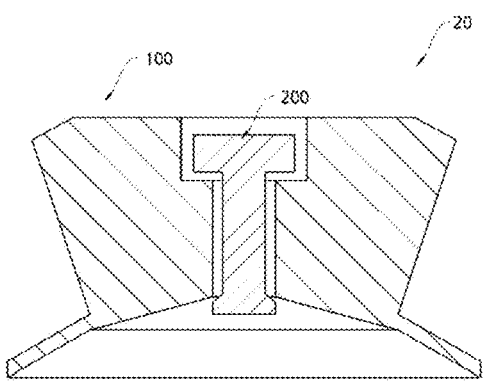
FIG. 6 is a partial cross-sectional view illustrating an embodiment of the present invention.
Figure 7:
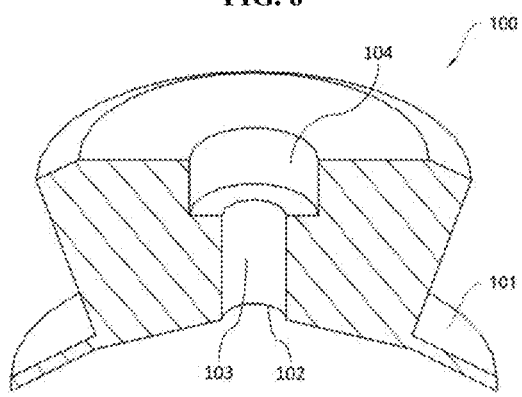
FIG. 7 is a partial cross-sectional view illustrating an embodiment of the present invention.
Figure 8:
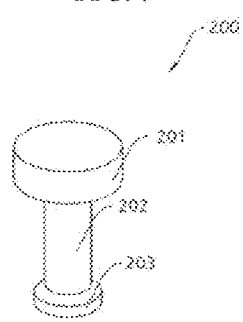
FIG. 8 is a partial perspective view illustrating an embodiment of the present invention.

FIG. 3 is a perspective view illustrating a state in which an upper head 201 is extended in the handle 20 (a protruded position). FIG. 4 is a partial perspective view illustrating a state in which the slide rod 202 is retracted in the handle 20 (a retracted position). FIG. 5 is a cross-sectional view the handle 20 taken by a plane passing the line 5-5 of FIG. 3. FIG. 6 is a cross-sectional view of the handle 20 taken by a plane passing the line 6-6 of FIG. 4. FIG. 7 is a vertical cross-sectional view of the body 100 taken by a plane passing the line 6-6 of FIG. 4. FIG. 8 is a perspective view illustrating a center post 200.

Referring to FIGS. 1 to 8, a suction-handle-type outdoor cookware lid (or cookware lid apparatus) 1 of the present invention includes the circular plate 10 and the handle lid handle) handle) 20, and the handle 20 includes the body (or handle body) 100 and the post (or center post) 200.

The circular plate 10 is a part used to cover an upper side of an outdoor cookware vessel. In a preferred embodiment of the present invention, the circular plate 10 is a circular metal plate.

In addition, a suction attachment mark 11 having a ring shape is formed on an upper center portion of the circular plate 10 such that a user may use the suction attachment mark 11 for center alignment when attaching the handle 20.

The handle 20 includes the body 100 having a tubular shape, and the center post 200 having a rod shape and inserted in the body 100. The handle 20 is attachable to the upper center portion of the circular plate 10. In a preferred embodiment of the present invention, the handle 20 is formed of flexible, soft silicone which does not change in properties at high temperatures.

The body 100 includes a soft suction plate (or bottom flange) 101 extending like a flange from a lower end portion of the body 100 so as to be fixedly attached to the upper center portion of the circular plate 10 by suction, a lower recess 102 defined in a lower end center portion of the body 100 and communicating with the inside of the body 100, a slide guide 103 communicating with the lower recess 102, and an upper recess 104 communicating with the slide guide (or through hole) 103. The upper recess 104 is formed into a top central portion of the body 100.

The center post 200 is longer than a length between an upper end portion of the upper recess (or top recess) 104 of the body 100 and a lower end portion of the lower recess 102 of the body 100 such that when in a suction attachment state, the center post 200 may protrude and may be pressed from an upper side of a center portion of the body 100. The lower end recess 102 provides a bottom opening formed into a bottom central portion of the body 100. The center post 200 includes the upper head 201 having an outer diameter surface for tight engagement with an inner diameter surface of the upper recess 104, a slide rod 202 extending from a lower end of the upper head 201 and slidable inside the slide guide 103, and a lower head 203 extending from a lower end of the slide rod 202 and having an outer diameter surface for tight engagement with an inner diameter surface of the lower recess 102. The center post 200 is inserted in the body 100 and vertically slidable to remove or maintain adhesive force by suction.

The lower end center portion of the body 100 is concave such that when the handle 20 is attached to the circular plate 10, a gap may be formed between the lower end center portion of the body 100 and an upper surface of the circular plate 10, and the lower head 203 may be slid downward in the gap by pressing the upper head 201 of the center post 200.

In addition, boundary portions between the slide rod 202, the upper head 201, and the slide rod 202 of the center post 200 may have a gradually curved slope shape for smooth sliding of the slide rod 202.

The outdoor cookware lid 1 may be used as follows according to an embodiment of the present invention.

When the outdoor cookware lid 1 is stored or carried, the handle 20 and the circular plate 10 may be separated from each other as shown in FIG. 1.

As shown in FIG. 2, when in use for cooking, the handle 20 is coupled to the circular plate 10 after aligning the handle 20 with an outer line of the suction attachment mark 11 formed on the center portion of the circular plate 10.

At this time, as shown in FIG. 3, as the handle 20 is pressed downward for suction attachment, the lower head 203 is pushed upward, and thus the upper head 201 protrudes up to the level of an upper end surface of the body 100. As a result, as shown in FIG. 5, the lower head 203 is tightly fitted into the lower recess 102, and a negative pressure is formed under the body 100 including the suction plate 101, thereby fixing the handle 20 to the circular plate 10 by adhesive force caused by suction.

When the handle 20 is detached from the circular plate 10, the upper head 201 is pressed to retract the upper head 201 as shown in FIG. 4, and then an air path is formed as shown in FIG. 6. As a result, the negative pressure applied to a suction attachment portion is released, and the adhesive force is removed. Then, the handle 20 is easily separated from the circular plate 10.

The scope of present invention is not limited to the above-described embodiments and the accompanying drawings but is defined by the appended claims. Those of ordinary skill in the art may make various replacements, modifications, or changes without departing from the scope of the present invention defined by the appended claims, and these replacements, modifications, or changes should be construed as being included in the scope of the present invention.

The invention claimed is:

1. A cookware lid apparatus comprising:
a cookware lid comprising a top surface;
a lid handle comprising a handle body and a post;
the handle body comprising a top recess, a bottom opening, a through hole, and a bottom flange;
the top recess formed into a top central portion of the handle body;
the bottom opening formed into a bottom central portion of the handle body;
the through hole formed through the handle body extending between the top recess and the bottom opening;
the bottom flange configured to contact the cookware lid for suction attachment;
the post comprising an upper head, a lower head, and a rod interconnecting the upper head and the lower head,
wherein the post is inserted in the through hole of the handle body such that the upper head is located on the side of the top recess and the lower head is located on the side of the bottom opening,
wherein the post is configured to move relative to the handle body upward and downward along an extension of the through hole such that the upper head is configured to move within the top recess between a retracted position and a protruded position,
wherein when the upper head is at the retracted position, the upper head is lower within the top recess than when the upper head is at the protruded position such that, when the upper head is at the retracted position, the lower head is located below the bottom opening, and further such that when the upper head is at the protruded position, the lower head is fitted into the bottom opening,
wherein the lid handle is configured such that, when the lid handle is placed on the top surface of the cookware lid and pressed downward, the lower head moves upward relative to the handle body to be tightly fitted into the bottom opening, the bottom flange contacts the cookware lid for suction attachment thereto, and the upper head moves within the top recess upward relative to the handle body to a level of an upper end surface of the handle body.

2. The cookware lid apparatus of claim 1, wherein the cookware lid comprises a circular plate.

3. The cookware lid apparatus of claim 2, further comprising a suction attachment mark of a ring shape formed on an upper center portion of the circular plate.

4. The cookware lid apparatus of claim 1, wherein the handle body is made of a material comprising silicone.

* * * * *